United States Patent
Choi et al.

(10) Patent No.: US 9,003,818 B2
(45) Date of Patent: Apr. 14, 2015

(54) HEAT PUMP TYPE HOT WATER SUPPLY APPARATUS

(75) Inventors: Hwanjong Choi, Changwon-Si (KR); Noma Park, Changwon-Si (KR); Heewoong Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 13/091,586

(22) Filed: Apr. 21, 2011

(65) Prior Publication Data

US 2011/0259027 A1    Oct. 27, 2011

(30) Foreign Application Priority Data

Apr. 23, 2010   (KR) .................. 10-2010-0038004

(51) Int. Cl.
  *F25B 13/00*    (2006.01)
  *F25B 7/00*    (2006.01)
  *F24D 17/02*    (2006.01)
  (Continued)

(52) U.S. Cl.
  CPC *F24D 17/02* (2013.01); *F24D 3/18* (2013.01); *F24D 2200/31* (2013.01); *F24F 1/0003* (2013.01); *F24F 5/0096* (2013.01); *F24F 2203/021* (2013.01); *F24F 2221/54* (2013.01); *Y02B 30/12* (2013.01); *Y02B 30/52* (2013.01)

(58) Field of Classification Search
  CPC ....... F24D 17/02; F24D 3/18; F24D 2200/31; F24F 1/0003; F24F 5/0096; F24F 2203/021; F24F 2221/54; Y02B 30/12; Y02B 30/52
  USPC ............. 62/159, 160, 173, 196.1, 197, 238.1, 62/238.6, 324.1, 238.7
  See application file for complete search history.

(56) References Cited

U.S. PATENT DOCUMENTS 3,984,050 A * 10/1976 Gustafsson .................. 237/2 B
4,011,989 A *  3/1977 Diggs ............................ 237/59
(Continued)

FOREIGN PATENT DOCUMENTS

| CN | 101000166 A | 7/2007 |
|---|---|---|
| CN | 101226019 A | 7/2008 |

(Continued)

OTHER PUBLICATIONS

Chinese Office Action issued in related Application No. 201110071082.5 dated Sep. 27, 2013.

*Primary Examiner* — Tho V Duong
*Assistant Examiner* — Aaron Isenstadt
(74) *Attorney, Agent, or Firm* — Ked & Associates, LLP

(57) ABSTRACT

A heat pump-type hot water supply apparatus may be provided that includes: a refrigeration cycle circuit (including a compressor, an outdoor heat exchanger, expansion devices, and an indoor heat exchanger); a hot water supply heat exchanger connected to the refrigeration cycle circuit to use the first refrigerant discharged from the compressor for a hot water supply; a cascade heat exchanger connected to the refrigeration cycle circuit to allow the first refrigerant passing through the hot water supply heat exchanger to evaporate a second refrigerant and thereafter, to be condensed, expanded, and evaporated in the refrigeration cycle circuit; a heat storage compressor compressing the second refrigerant evaporated in the cascade heat exchanger, a heat storage tank to heat water using the second refrigerant compressed by the heat storage compressor, and a heat storage expansion device to expand the second refrigerant condensed in the heat storage tank.

10 Claims, 8 Drawing Sheets

(51) Int. Cl.
  *F24D 3/18* (2006.01)
  *F24F 1/00* (2011.01)
  *F24F 5/00* (2006.01)

(56) References Cited

U.S. PATENT DOCUMENTS

| | | | |
|---|---|---|---|
| 4,592,206 A * | 6/1986 | Yamazaki et al. | 62/160 |
| 5,269,153 A * | 12/1993 | Cawley | 62/180 |
| 5,906,104 A * | 5/1999 | Schwartz et al. | 62/79 |
| 7,640,763 B2 * | 1/2010 | Nishimura et al. | 62/238.6 |
| 8,006,504 B2 * | 8/2011 | Ko et al. | 62/126 |
| 8,074,459 B2 * | 12/2011 | Murakami et al. | 62/159 |
| 8,312,734 B2 * | 11/2012 | Lewis | 62/335 |
| 2010/0077788 A1 * | 4/2010 | Lewis | 62/324.6 |

FOREIGN PATENT DOCUMENTS

| | | |
|---|---|---|
| CN | 101294754 A | 10/2008 |
| JP | 59-13871 | 1/1984 |
| JP | 59-134469 | 8/1984 |
| JP | 61-001967 | 1/1986 |
| JP | 02-251060 | 10/1990 |
| JP | 2001-263857 | 9/2001 |
| JP | 2004-218943 | 8/2004 |
| JP | 2005-249319 A | 9/2005 |
| KR | 10-0497161 | 6/2005 |

* cited by examiner

HEAT PUMP TYPE HOT WATER SUPPLY APPARATUS

CROSS-REFERENCE TO RELATED APPLICATION

This application claims priority from Korean Application No. 10-2010-0038004, filed Apr. 23, 2010, the subject matter of which is incorporated herein by reference.

BACKGROUND

1. Field

Embodiments of the present invention may relate to a heat pump type hot water supply apparatus capable of storing heat of a refrigerant compressed by a compressor, and using the heat for a hot water supply.

2. Background

A heat pump is a cooling and heating apparatus that transfers a low-temperature heat source to a high temperature or that transfers a high-temperature heat source to a low temperature by using heat generation or condensation heat of a refrigerant.

The heat pump may include a compressor, an outdoor heat exchanger, an expansion device and an indoor heat exchanger. A heat pump type hot water supply apparatus may be used for a hot water supply by heating water with a refrigerant compressed by the compressor to minimize consumption of fossil fuel.

JP 2001-263857 A, the subject matter of which is incorporated herein by reference, discloses a cooling and heating hot water supply apparatus in which the refrigerant discharged from a compressor passes in sequence through a hot water supply heat exchanger, an outdoor heat exchanger, an expansion device, and an air-conditioning heat exchanger and is recovered to the compressor, or the refrigerant discharged from the compressor passes in sequence through the air-conditioning heat exchanger, an expansion device, and the outdoor heat exchanger, and is recovered to the compressor.

However, the cooling and heating hot water supply apparatus in the disadvantageous arrangement may be used for only hot water supply and air-conditioning, but it can not be more variously utilized.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
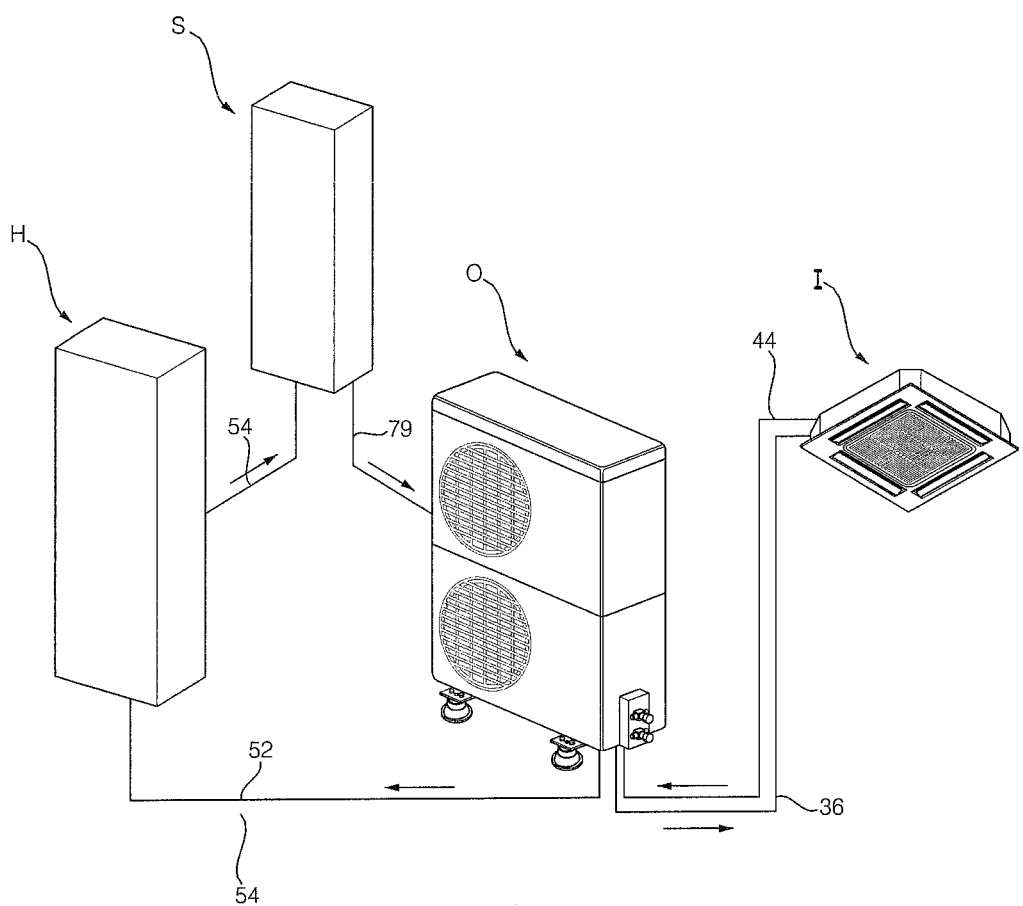
FIG. 1 is a diagram of a heat pump-type hot water supply apparatus according to an exemplary embodiment of the present invention.

Exemplary embodiments of the present invention may be described with reference to the accompanying drawings. In describing the exemplary embodiments, like reference numerals refer to like elements and a resulting additional description may be omitted.

Figure 2:
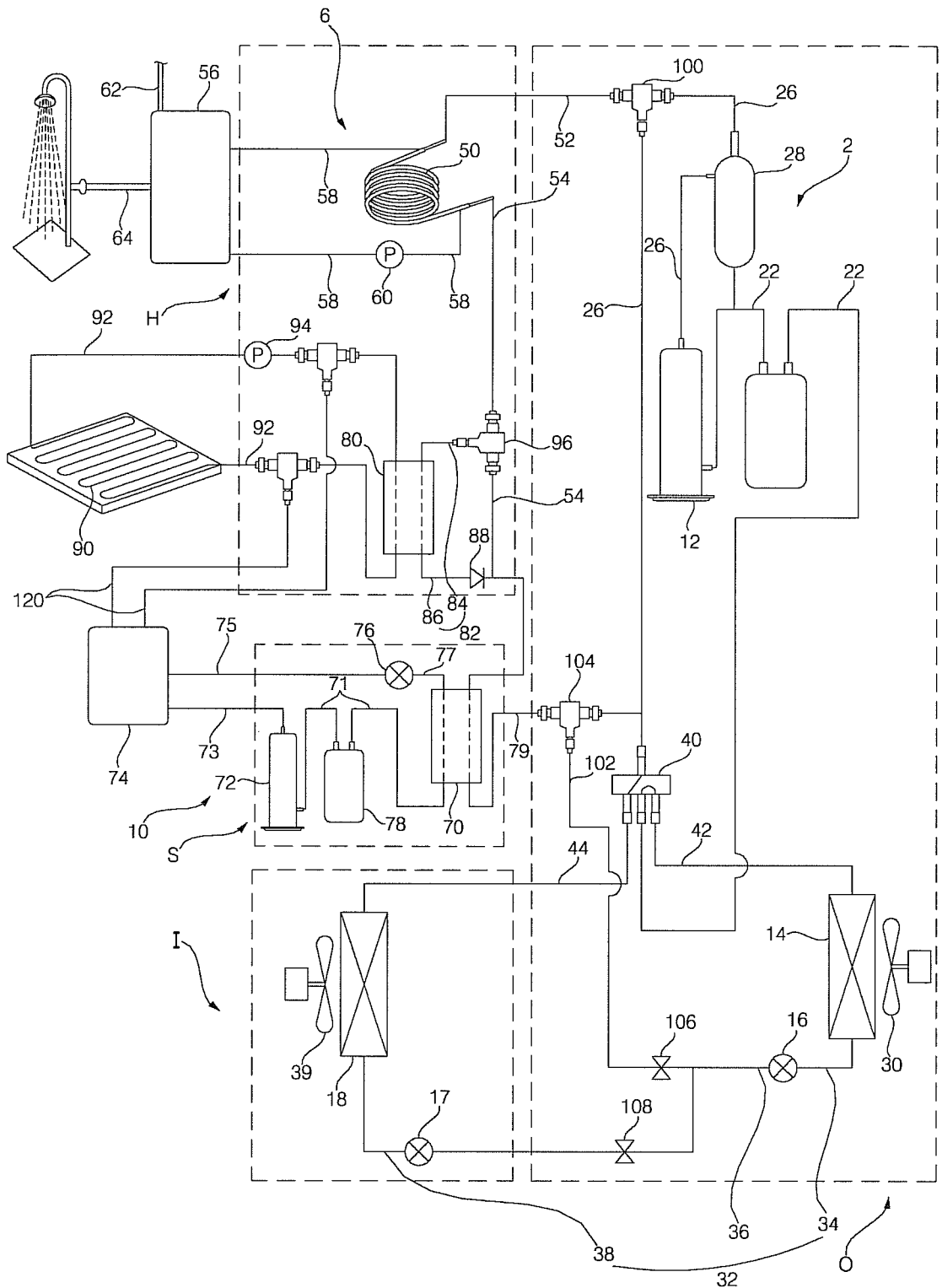
FIG. 2 is a diagram of a heat pump-type hot water supply apparatus according to an exemplary embodiment of the present invention.

FIG. 1 is a diagram of a heat pump-type hot water supply apparatus according to an exemplary embodiment of the present invention. FIG. 2 is a diagram of a heat pump-type hot water supply apparatus according to an exemplary embodiment of the present invention. Other embodiments and configurations may also be provided.

FIG. 1 shows a heat pump-type hot water supply apparatus that includes an outdoor unit O, a hot water supply unit H, a heat storage unit S and an indoor unit I.

An air-conditioner may include a refrigeration cycle circuit 2 (or refrigeration cycle part) in which a first refrigerant air-conditions a room, a hot water supply circuit 6 (or hot water supply part) in which the first refrigerant is used for a hot water supply, and a heat storage circuit 10 (or heat storage part) in which the first refrigerant and a second refrigerant are used to store heat.

The refrigeration cycle circuit 2 may form a low-temperature refrigeration cycle and the heat storage circuit 10 may form a high-temperature refrigeration cycle that exchanges heat with the low-temperature refrigeration cycle.

The first refrigerant and the second refrigerant may be configured by refrigerants having a condensation temperature and an evaporation temperature that are different from each other. For example, when the first refrigerant is R410a having a low condensation temperature and evaporation temperature, the second refrigerant may be configured by R134a having a higher condensation temperature and evaporation temperature than the first refrigeration.

The refrigeration cycle circuit 2 may include a compressor 12, an outdoor heat exchanger 14, expansion devices 16 and 17, and an indoor heat exchanger 18 through which the first refrigerant passes to perform an air-conditioning operation.

The refrigeration cycle circuit 2 may perform cooling-air-conditioning or heating-air-conditioning of a room. The air-conditioning operation of the refrigeration cycle circuit 2 may include a spatial heating operation to perform the heating-air-conditioning by heating indoor air and a spatial cooling operation to perform the cooling-air-conditioning by cooling the indoor air.

In the refrigeration cycle circuit 2, an accumulator for preventing a liquid refrigerant of the first refrigerant from flowing into the compressor 12 may be provided on a suction path 22 of the compressor 12, and an oil separator 28 for separating oil from the first refrigerant and oil discharged from the compressor 12 and recovering the separated oil to the compressor 12 may be provided on a discharge path 26 of the compressor 12.

The outdoor heat exchanger 14, which condenses or evaporates the first refrigerant, may include an air and refrigerant heat exchanger where outdoor air exchanges heat with the first refrigerant, and/or may include a water and refrigerant heat exchanger where cooling water exchanges heat with the first refrigerant.

In an example where the outdoor heat exchanger 14 is configured by the air and refrigerant heat exchanger, an outdoor fan 30 may blow outdoor air to the outdoor heat exchanger 14.

The outdoor heat exchanger 14 may be connected with the indoor heat exchanger 18 through a heat exchanger connection pipe 32.

The expansion devices 16 and 17 may be installed on the heat exchanger connection pipe 32.

The expansion devices 16 and 17 may include an outdoor expansion device 16 provided adjacent to the outdoor heat exchanger 14, and an indoor expansion device 17 provided adjacent to the indoor heat exchanger 18.

The heat exchanger connection pipe 32 may include an outdoor heat exchanger-outdoor expansion device connection pipe 34 through which the outdoor heat exchanger 14 and the outdoor expansion device 16 are connected, an expansion device connection pipe 36 through which the outdoor expansion device 16 and the indoor expansion device 17 are connected, and an indoor expansion device-indoor heat exchanger connection pipe 38 though which the indoor expansion device 17 and the indoor heat exchanger 18 are connected.

In the indoor heat exchanger 18, indoor air exchanges heat with the first refrigerant to cool or heat a room. An indoor fan 39 may circulate indoor air to the indoor heat exchanger 18.

The refrigeration cycle circuit 2 may include a cooling air-conditioner that is connected to allow the first refrigerant compressed by the compressor 12 to pass in sequence through the outdoor heat exchanger 14, the expansion devices 16 and 17, and the indoor heat exchanger 18, and to be recovered to the compressor 12 to cool indoor air.

The refrigeration cycle circuit 2 may include a heating air-conditioner that is connected to allow the first refrigerant compressed by the compressor 12 to pass in sequence through the indoor heat exchanger 18, the expansion devices 16 and 17, and the outdoor heat exchanger 14, and to be recovered to the compressor 12 to heat the indoor air.

The refrigeration cycle circuit 2 may include a heating and cooling air-conditioner that allows the first refrigerant compressed by the compressor 12 to pass in sequence through the outdoor heat exchanger 14, the expansion devices 16 and 17, and the indoor heat exchanger 18, and to be recovered to the compressor 12 during a heating operation, and allows the first refrigerant to pass in sequence through the indoor heat exchanger 18, the expansion devices 16 and 17, and the outdoor heat exchanger 14, and to be recovered to the compressor 12 during a cooling operation.

In the refrigeration cycle circuit 2, the indoor heat exchanger 18 is installed to cool or heat the room. The refrigeration cycle circuit 2 may be configured by the heating and cooling air-conditioner that can switch between the cooling operation and the heating operation.

The refrigeration cycle circuit 2 may further include a cooling/heating switching valve 40 that allows the first refrigerant to flow in sequence to the compressor 12, the outdoor heat exchanger 14, the expansion devices 16 and 17, and the indoor heat exchanger 18, or to flow in sequence to the compressor 12, the indoor heat exchanger 18, the expansion devices 16 and 17, and the outdoor heat exchanger 14.

The cooling/heating switching valve 40 may be connected to the compressor 12, and the compressor suction path 22 and the compressor discharge path 26, connected to the outdoor heat exchanger 14 and an outdoor heat exchanger connection pipe 42, and/or connected to the indoor heat exchanger 18 and the indoor heat exchanger connection pipe 44.

The hot water supply circuit 6, which allows the first refrigerant discharged from the compressor 12 to heat water used for a hot water supply, may include a hot water supply heat exchanger 50 connected to the refrigeration cycle circuit 2 to use the first refrigerant discharged from the compressor 12 for a hot water supply.

The hot water supply heat exchanger 50 may be a desuperheater in which the first refrigerant overheated by the compressor 12 is condensed while exchanging heat with water used for a hot water supply.

The hot water supply heat exchanger 50 may be connected to the refrigeration cycle circuit 2 and a hot water supply inflow path 52 such that the first refrigerant flows into the hot water supply heat exchanger 50 through the hot water supply inflow path 52.

One end of the hot water supply inflow path 52 may be connected to the hot water supply heat exchanger 50 and the other end of the hot water supply inflow path 52 may be connected between the compressor 12 and the cooling/heating switching valve 40.

The hot water supply heat exchanger 50 may have a refrigerant path through which the overheated first refrigerant passes and a water path through which the water used for hot water supply passes.

A hot water supply outflow path 54, through which the first refrigerant passing through the refrigerant path, may be connected to the hot water supply heat exchanger 50.

The hot water supply heat exchanger 50 may be a double pipe heat exchanger in which the refrigerant path and the water path are positioned inside and outside with a heat transfer member interposed therebetween, or the hot water supply heat exchanger 50 may be a plate-type heat exchanger in which the refrigerant path and the water path are alternately positioned with the heat transfer member interposed therebetween.

The hot water supply heat exchanger 50 may be connected to a hot water supply tank 56 and a hot water supply circulation path 58, and a hot water supply pump 60 may be provided on the hot water supply circulation path 58.

The hot water supply tank 56, which contains water used for a hot water supply and that heats the contained water, may be connected to a water supply unit 62 through which outdoor water is supplied to the hot water supply tank 56 and a water discharge unit 64 through which water in the hot water supply tank 56 is discharged.

The hot water supply tank 56 may allow water that flows into the hot water supply tank 56 after being heated by the hot water supply heat exchanger 50 to be directly discharged to the water discharge unit 64.

In the hot water supply tank 56, a hot water supply coil connected with the hot water supply circulation path 58 may be provided therein, the water heated by the hot water supply heat exchanger 50 may heat the inside of the hot water supply tank 56 while passing through the hot water supply coil and the water that flows into the water supply unit 62 is heated by the hot water supply coil to be discharged to the water discharge unit 64.

The heat storage circuit 10 may store the heat of the first refrigerant and the heat of the second refrigerant.

The heat storage circuit 10 may include a cascade heat exchanger 70 connected to the refrigeration cycle circuit 2 to allow the first refrigerant passing through the hot water supply heat exchanger 50 to be condensed, expanded, and evaporated in the refrigeration cycle circuit 2 after evaporating the second refrigerant. The heat storage circuit 10 may also include a heat storage compressor 72 for compressing the second refrigerant evaporated in the cascade heat exchanger 70, a heat storage tank 74 in which the second refrigerant compressed by the heat storage compressor 72 heats water, and a heat storage expansion device 76 in which the second refrigerant condensed in the heat storage tank 74 is expanded.

The cascade heat exchanger 70 may have a first refrigerant path through which the first refrigerant passes and a second refrigerant path through which the second refrigerant used for a hot water supply passes.

The cascade heat exchanger 70 may be a double pipe heat exchanger in which the first refrigerant path and the second refrigerant path are positioned inside and outside with the heat transfer member interposed therebetween, or the cascade heat exchanger 70 may be a plate-type heat exchanger in which the first refrigerant path and the second refrigerant path are alternately positioned with the heat transfer member interposed therebetween.

In the cascade heat exchanger 70, the second refrigerant path may be connected to the heat storage compressor 72 and a heat storage compressor suction path 71.

An accumulator 78 that accumulates the liquid refrigerant to prevent the liquid refrigerant to flow into the heat storage compressor 72 may be provided on the heat storage compressor suction path 71.

The cascade heat exchanger 70 may be connected to the hot water supply heat exchanger 50 and the hot water supply outflow path 54, and may be connected to the refrigeration cycle circuit 2 and a cascade outflow path 79.

The cascade outflow path 79 may connect the cascade heat exchanger 70 to the cooling/heating switching valve 40.

The heat storage compressor 72 may be connected to the heat storage tank 74 and a heat storage compressor discharge path 73.

The heat storage tank 74 may store heat of the first refrigerant and heat of the second refrigerant when a power supply (or power supply price) is low or at least one of a hot water supply load, a floor heating load, and a space heating load is low at night and transfer the heat to any one of hot water supply, floor heating, and space heating when the power supply (or power supply price) is high in the daytime.

The use of the stored heat of the heat storage tank 74 may be described below.

The heat storage tank 74 may be connected to a heat storage expansion device 76 and a heat storage tank-heat storage expansion device connection pipe 75.

The heat storage tank 74 may include a heat storage coil connected the heat storage compressor discharge path 73 and the heat storage tank-heat storage expansion device connection pipe 75 provided therein to heat water inside of the heat storage tank 74.

The heat storage coil, as one kind of heat storage heat exchanger through which the second refrigerant passes, may be provided inside of the heat storage tank 74.

The heat storage expansion device 76 may be connected to the cascade heat exchanger 70 and a heat storage expansion device-cascade heat exchanger connection pipe 77.

In the heat pump-type hot water supply apparatus, the first refrigerant compressed by the compressor 12 may be first condensed in the hot water supply heat exchanger 50 and thereafter condensed in the cascade heat exchanger 70 and in this example, the second refrigerant expanded by the heat storage expansion device 76 may be evaporated while condensing the first refrigerant in the cascade heat exchanger 70.

In the heat pump-type hot water supply apparatus, the first refrigerant heating the hot water supply heat exchanger 50 may immediately flow to the cascade heat exchanger 70, and may flow to the cascade heat exchanger 70 after being used for an indoor floor heating.

The heat pump-type hot water supply apparatus may further include a water and refrigerant heat exchanger 80 that is connected between the hot water supply heat exchanger 50 and the cascade heat exchanger 70.

The water and refrigerant heat exchanger 80 may be connected to the hot water supply outflow path 54 through a water and refrigerant heat exchanger connection path 82 to allow the first refrigerant passing through the hot water supply heat exchanger 50 to selectively pass.

The water and refrigerant heat exchanger connection path 82 may include a floor heating inflow path 84 through which the refrigerant of the hot water supply outflow path 54 flows into the water and refrigerant heat exchanger 80 and a floor heating outflow path 86 through which the refrigerant passing through the water and refrigerant heat exchanger 80 flows out to the hot water supply outflow path 54.

A check valve 88 may be provided on the floor heating outflow path 86 for preventing the refrigerant of the hot water supply outflow path 54 from flowing backward to the water and refrigerant heat exchanger 80 through the floor heating outflow path 86.

The water and refrigerant heat exchanger 80 may be a condensation heat exchanger in which the first refrigerant first condensed in the hot water supply heat exchanger 50 may be additionally condensed while exchanging heat with water.

The water and refrigerant heat exchanger 80 may have a refrigerant path through which the first refrigerant passing through the hot water supply heat exchanger 50 passes and a water path through which water used for floor heating passes.

The water and refrigerant heat exchanger 80 may include a double pipe heat exchanger in which the refrigerant path and the water path are positioned inside and outside respectively, with the heat transfer member interposed therebetween, or may include a plate-type heat exchanger in which the refrigerant path and the water path are alternately positioned with the heat transfer member interposed therebetween.

In the heat pump-type hot water supply apparatus, the water and refrigerant heat exchanger 80 may be connected to a floor heating pipe 90 and a heating circulation path 92 that are provided on an indoor flow path and when a floor heating pump 94 is provided on the heating circulation path 92, the heat of the first refrigerant passing through the hot water supply heat exchanger 50 may be additionally used for indoor floor heating.

The heat pump-type hot water supply apparatus may include a water and refrigerant heat exchanger refrigerant controller 96 that controls flow of the refrigerant to allow the first refrigerant passing through the hot water supply heat exchanger 50 to pass through the water and refrigerant heat exchanger 80 or bypass the water and refrigerant heat exchanger 80.

The water and refrigerant heat exchanger 80 may be directly connected with the hot water supply outflow path 54 to allow the refrigerant passing through the hot water supply heat exchanger 50 to be used for floor heating at all times, although it may be provided for a user to selectively perform a floor heating operation.

The water and refrigerant heat exchanger refrigerant controller 96 may be a floor heating valve that allows the refrigerant to pass through the water and refrigerant heat exchanger 80 at a time when the when the user selects the floor heating.

The water and refrigerant heat exchanger refrigerant controller 96 may control a flowing direction of the refrigerant to allow the refrigerant to flow to the water and refrigerant heat exchanger 80 in an operation of the heat pump-type hot water supply apparatus which includes floor heating. The water and refrigerant heat exchanger refrigerant controller 96 may control the flowing direction of the refrigerant to allow the refrigerant to bypass the water and refrigerant heat exchanger 80 in an example in which operation of the heat pump-type hot water supply apparatus does not include the floor heating operation.

The water and refrigerant heat exchanger refrigerant controller 96 may control the refrigerant to flow to the water and refrigerant heat exchanger 80 in the floor heating operation, a simultaneous operation of the floor heating operation and the hot water supply operation, and a simultaneous operation of the floor heating operation, the hot water supply operation, and the air-conditioning operation.

The water and refrigerant heat exchanger refrigerant controller 96 may be one 3-way valve that is provided on the hot water supply outflow path 54 to select an outflow direction of the refrigerant.

When the water and refrigerant heat exchanger refrigerant controller 96 is the 3-way valve, an inlet and a first outlet may be connected with the hot water supply outflow path 54 and a second outlet may be connected to the floor heat outflow path 86.

The water and refrigerant heat refrigerant controller 96 may include a first valve that is opened during the floor heating operation and is closed when the floor heating operation is not performed, and a second valve that is provided on the hot water supply path 54 to be closed during the floor heating operation and to be opened when the floor heating operation is not performed.

The heat pump-type hot water supply apparatus may further include a refrigerant controller 100 that controls a flowing direction of the first refrigerant discharged from the compressor 12 so as to allow the first refrigerant discharged from the compressor 12 to pass through or bypass the hot water supply heat exchanger 50 and the cascade heat exchanger 70.

The refrigerant controller 100 may control the first refrigerant compressed by the compressor 12 to flow to the hot water supply heat exchanger 50 in an example in which operation of the heat pump-type hot water supply apparatus includes at least one operation of the hot water supply operation and the floor heating operation, and the refrigerant controller 100 may control the first refrigerant compressed by the compressor 12 to bypass the hot water supply heat exchanger 50 and the cascade heat exchanger 70 in an example in which operation of the heat pump-type hot water supply apparatus does not include both the hot water supply operation and the floor heating operation.

The refrigerant controller 100 may control the first refrigerant to flow to the hot water supply heat exchanger 50 during the hot water supply operation.

The refrigerant controller 100 may control the first refrigerant to flow to the hot water supply heat exchanger 50 during simultaneous hot water supply and the air-conditioning operations.

The refrigerant controller 100 may control the first refrigerant to flow to the hot water supply heat exchanger 50 while simultaneously performing the hot water supply operation and the floor heating operation.

The refrigerant controller 100 may control the first refrigerant to flow to the hot water supply heat exchanger 50 while simultaneously performing the hot water supply operation, the floor heating operation, and the air-conditioning operation.

The refrigerant controller 100 may control the first refrigerant to flow to the hot water supply heat exchanger 50 while performing the floor heating operation.

The refrigerant controller 100 may control the first refrigerant to bypass the hot water supply heat exchanger 50 and the cascade heat exchanger 70 during the air-conditioning operation. That is, the refrigerant controller 100 may control the first refrigerant to bypass the hot water supply heat exchanger 50 and the cascade heat exchanger 70 during a space cooling operation.

The heat pump-type hot water supply apparatus may include a bypass path 102 to guide the first refrigerant passing through the hot water supply heat exchanger 50 and the cascade heat exchanger 70 between the outdoor heat exchanger 14 and the indoor heat exchanger 18 so as to allow the first refrigerant passing through the hot water supply heat exchanger 50 and the cascade heat exchanger 70 to bypass any one of the outdoor heat exchanger 14 and the indoor heat exchanger 18.

One end of the heat exchanger bypass path 102 may be connected to the cascade outflow path 79 and the other end of the heat exchanger bypass path 102 may be connected between the indoor expansion device 17 and the outdoor expansion device 16 to guide the first refrigerant of the cascade outflow path 79 to between the indoor expansion device 17 and the outdoor expansion device 16.

The first refrigerant guided to the heat exchanger bypass path 102 may be expanded in the indoor expansion device 17 and thereafter may evaporate in the indoor heat exchanger 18 to be recovered to the compressor 12, or the first refrigerant may be expanded in the outdoor expansion device 16 and thereafter may evaporate in the outdoor heat exchanger 14 to be recovered to the compressor 12.

In the example in which the first refrigerant is guided between the indoor expansion device 17 and the outdoor expansion device 16 through the heat exchanger bypass path 102, a condensation process does not occur and only the expansion process and the evaporation process occur in the refrigeration cycle circuit 2, and the heat transfer amounts of the cascade heat exchanger 70 and the water and refrigerant heat exchanger 72 increase and hot water supply efficiency and floor heating efficiency may be improved.

The heat pump-type hot water supply apparatus may include an auxiliary refrigerant controller 104 that controls the flowing direction of the first refrigerant passing through the cascade heat exchanger 70 to allow the first refrigerant passing through the cascade heat exchanger 70 to pass through the heat exchanger bypass path 102 or to bypass the heat exchanger bypass path 102.

The auxiliary refrigerant controller 104 may control the first refrigerant passing through the cascade heat exchanger 70 to bypass the heat exchanger bypass path 102 in an example in which operation of the heat pump-type hot water supply apparatus includes both the hot water supply operation and the air-conditioning operation.

For example, the auxiliary refrigerant controller 104 may control the first refrigerant passing through the cascade heat exchanger 70 to bypass the heat exchanger bypass path 102 when the hot water supply operation and the air-conditioning operation are simultaneously performed.

The auxiliary refrigerant controller 104 may control the first refrigerant passing through the cascade heat exchanger 70 to bypass the heat exchanger bypass path 102 in an example in which the hot water supply operation, the floor heating operation, and the air-conditioning operation are simultaneously performed.

The auxiliary refrigerant controller 104 may control the first refrigerant passing through the cascade heat exchanger 70 to flow to the heat exchanger bypass path 102 during the air-conditioning operation.

The auxiliary refrigerant controller 104 may control the first refrigerant passing through the cascade heat exchanger 70 to flow to the heat exchanger bypass path 102 during the hot water supply operation.

The auxiliary refrigerant controller 104 may control the first refrigerant passing through the cascade heat exchanger 70 to flow to the heat exchanger bypass path 102 when the hot water supply operation and the floor heating operation are simultaneously performed.

The auxiliary refrigerant controller 104 may control the first refrigerant passing through the cascade heat exchanger 70 to flow to the heat exchanger bypass path 102 during the floor heating operation.

When a defrost condition is reached during the hot water supply operation, the auxiliary refrigerant controller 104 controls the refrigerant passing through the cascade heat exchanger 70 to bypass the heat exchanger bypass path 102, the refrigeration cycle circuit 2 may be switched from the heating operation to the cooling operation for defrost of the outdoor heat exchanger 14, and the first refrigerant passing through the cascade heat exchanger 70 flows into the outdoor heat exchanger 14 to heat the outdoor heat exchanger 14. Therefore, the outdoor heat exchanger 14 is defrosted.

The heat pump-type hot water supply apparatus may further include a heat exchanger bypass valve 106 provided on the heat exchanger bypass path 102 to control flow of the first refrigerant and a liquid refrigerant valve 108 provided between the heat exchanger bypass path 102 and the indoor expansion device 17 to control the flow of the first refrigerant.

The heat exchanger bypass valve 106 may be opened in an example in which the hot water supply operation and the floor heating operation are simultaneously performed or the floor heating operation or the hot water supply operation is performed. The heat exchanger bypass valve 106 may be closed when the air-conditioning operation is performed or the air-conditioning operation and the hot water supply operation are simultaneously performed, or the air-conditioning operation, the hot water supply operation, and the floor heating operation are simultaneously performed.

The liquid refrigerant valve 108 may be opened when the air-conditioning operation is performed, the air-conditioning operation and the hot water supply operation are simultaneously performed, or the air-conditioning operation, the hot water supply operation, and the floor heating operation are simultaneously performed. The liquid refrigerant valve 108 may be closed when either the hot water supply operation and the floor heating operation are simultaneously performed or the floor heating operation or the hot water supply operation is performed.

The heat storage of the heat storage tank 74 may now be described.

The heat storage tank 74 may be connected with at least one of the hot water supply circulation path 58, the heating circulation path 92, and the indoor heat exchanger 18 through the heat storage pipe 120.

The heat storage tank 74 is connected to at least one of the hot water supply path 58, the heating circulation path 92, and the indoor heat exchanger 18 to store part of the heat of the first refrigerant and heat of the second refrigerant during the hot water supply operation or at least one operation of the floor heating operation and the space heating operation. Moreover the heat storage tank 74 may store heat of the first refrigerant and heat of the second refrigerant by a heat storage operation other than the hot water supply operation or at least one operation of the floor heating operation and the space heating operation.

The heat storage operation is an operation in which heat of the first refrigerant and heat of the second refrigerant are stored in the heat storage tank 74. While the heat storage operation is performed in a same manner as the hot water supply operation, the heat storage compressor 72 may be driven, or while the heat storage operation is performed in a same manner as the floor heating operation, the heat storage compressor 72 may be driven.

The heat storage tank 74 may be connected to the hot water supply circulation path 58 and may not be connected to the heating circulation path 92. The heat of the first refrigerant and the heat of the second refrigerant may be stored when the first refrigerant passes through the cascade heat exchanger 70 and the heat may be transferred to the hot water supply tank 56.

The heat storage tank 74 may not be connected to the hot water supply circulation path 58 and may be connected to the heating circulation path 92. Therefore, the heat of the first refrigerant and the heat of the second refrigerant are stored when the first refrigerant passes through the water and refrigerant heat exchanger 72 and the stored heat may be transferred to the floor heating pipe 90.

In an example in which the heat storage tank 74 is connected to only one of the hot water supply circulation path 58 and the heating circulation path 92, the heat of the first refrigerant may be stored in the hot water supply heat exchanger 50. As a result, in an example in which the heat storage tank 74 is connected to the heating circulation path 92 into which the heat of the first refrigerant is comparatively less absorbed, both the hot water supply and the floor heating may be effectively performed, and hereinafter the heat storage tank 74 may be connected to the heating circulation path 92.

The refrigeration cycle circuit 2 (or refrigeration cycle part) may be configured with a separate air-conditioner and may include an outdoor unit O and an indoor unit I, a hot water supply unit H connected to the outdoor unit O, and a heat storage unit S connected to the hot water supply unit H and the outdoor unit O, as shown in FIGS. 1 and 2.

The compressor 12, the cooling/heating switching valve 40, the outdoor heat exchanger 14, the outdoor expansion device 16, and the outdoor fan 30 may be provided in the outdoor unit O.

The indoor expansion device 17, the indoor heat exchanger 18, and the indoor fan 39 may be provided in the indoor unit I.

The hot water supply heat exchanger 50 and the hot water supply pump 60 may be provided in the hot water supply unit H.

The water and refrigerant heat exchanger 80, the floor heating pump 94, and the water and refrigerant heat exchanger refrigerant controller 96 may be provided in the hot water supply unit H.

The cascade heat exchanger 70, the heat storage compressor 72, and the heat storage expansion device 76 may be provided in the heat storage unit S.

The refrigerant controller 100, the heat exchanger bypass path 102, the auxiliary refrigerant controller 104, the heat exchanger bypass valve 106, and the liquid refrigerant valve 108 may be provided in the outdoor unit O.

Simultaneous operation of a hot water supply operation and a heat storage operation may be referred to as a hot water supply/heat storage operation.

Figure 3:
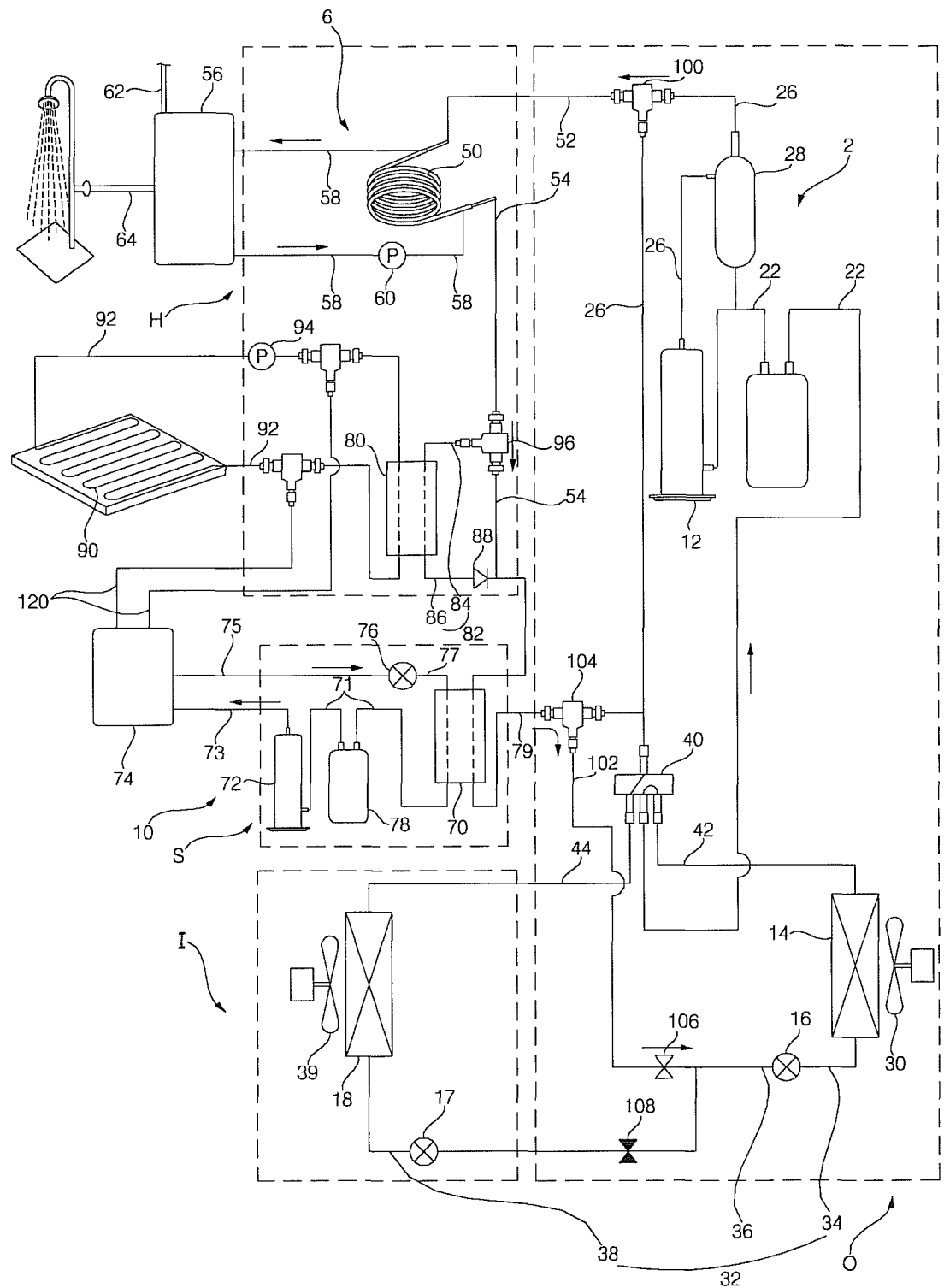
FIG. 3 is a diagram illustrating a flow of the refrigerant when the heat pump-type hot water supply apparatus (FIG. 2) is in a hot water supply/heat storage operation.

FIG. 3 is a diagram illustrating a flow of the refrigerant when the heat pump-type hot water supply apparatus (FIG. 2)

is in the hot water supply/heat storage operation. Other embodiments and configurations may also be provided.

In the hot water supply/heat storage operation, the heat pump-type hot water supply apparatus may operate as follows.

The compressor 12 and the heat storage compressor 72 may be driven. The refrigerant controller 100 may control the first refrigerant to flow to the hot water supply heat exchanger 50. The water and refrigerant heat exchanger refrigerant controller 96 may control the first refrigerant of the hot water supply outflow path 54 to bypass the water and refrigerant heat exchanger 80. The auxiliary refrigerant controller 104 may control the first refrigerant of the cascade outflow path 79 to pass through the heat exchanger bypass path 102. The outdoor fan 30 rotates, and the indoor fan 39 does not rotate. The cooling/heating switching valve 40 may be driven in the heating mode. The heat exchanger bypass valve 106 is opened, and the liquid refrigerant valve 108 is closed. The hot water supply pump 60 may be driven, and the floor heating pump 94 may not be driven.

When the hot water supply pump 60 is driven, water of the hot water supply tank 56 flows to the hot water supply heat exchanger 50 through the hot water supply circulation path 58 and passes through the hot water supply heat exchanger 50, and thereafter circulates to the hot water supply tank 56.

When the heat storage compressor 72 is driven, the second refrigerant compressed by the heat storage compressor 72 is condensed in the heat storage tank 74 and thereafter expands by the heat storage expansion device 76, evaporates while passing through the cascade heat exchanger 70, and recovers to the heat storage compressor 72.

When the compressor 12 is driven, the first refrigerant compressed by the compressor 12 passes through the refrigerant controller 100 and the hot water supply inflow path 52 and thereafter flows to the hot water supply heat exchanger 50, and the first refrigerant overheated in the compressor 12 exchanges heat with water and condenses while passing through the hot water supply heat exchanger 50. The first refrigerant condensed in the hot water supply heat exchanger 50 flows into the water and refrigerant heat exchanger refrigerant controller 96, bypasses the water and refrigerant heat exchanger 80, and flows into the cascade heat exchanger 70. The first refrigerant exchanges heat with the second refrigerant to be recondensed while passing through the cascade heat exchanger 70.

The first refrigerant passing through the cascade heat exchanger 70 flows into the auxiliary refrigerant controller 104 and flows to the heat exchanger bypass path 102 and passes through the heat exchanger bypass valve 106 and thereafter is expanded by the outdoor expansion device 16. The refrigerant expanded by the outdoor expansion device 16 may exchange heat with the outdoor air to evaporate in the outdoor heat exchanger 14 and pass through the cooling/heating switching valve 40 to be recovered to the compressor 12.

The first refrigerant discharged from the compressor 12 may pass in sequence through the hot water supply heat exchanger 50, the cascade heat exchanger 70, the heat exchanger bypass path 102, the outdoor expansion device 16, the outdoor heat exchanger 14, and the cooling/heating switching valve 40, and thereafter is recovered to the compressor 12.

The hot water supply heat exchanger 50 may be heated by condensing the first refrigerant, and the hot water supply pump 60 circulates water of the hot water supply tank 56 to the hot water supply heat exchanger 50 and the hot water supply tank 56 to heat the water of the hot water supply tank 56.

The cascade heat exchanger 70 may be heated by recondensing the first refrigerant, and the second refrigerant may circulate to the cascade heat exchanger 70 and the heat storage tank 74 by driving the hot water supply compressor 72 to heat the water of the heat storage tank 74.

In the heat pump-type hot water supply apparatus, heat which the first refrigerant absorbs while being evaporated in the outdoor heat exchanger 14, may be transferred to the hot water supply tank 56 and the heat storage tank 74 during the hot water supply/heat storage operation.

The first refrigerant may be used to heat the water of the hot water supply tank 56 and thereafter may be used to heat the water of the heat storage tank 74, and the second refrigerant may be used to heat the water of the heat storage tank 74 to thereby store heat in the heat storage tank 74 while increasing temperature of the water of the hot water supply tank 56.

In the heat pump-type hot water supply apparatus, during the hot water supply operation, the hot water supply pump 60 may not be driven during the hot water supply/heat storage operation and during the heat storage operation. Moreover, the heat storage compressor 72 may not be driven during the hot water supply/heat storage operation.

Figure 4:
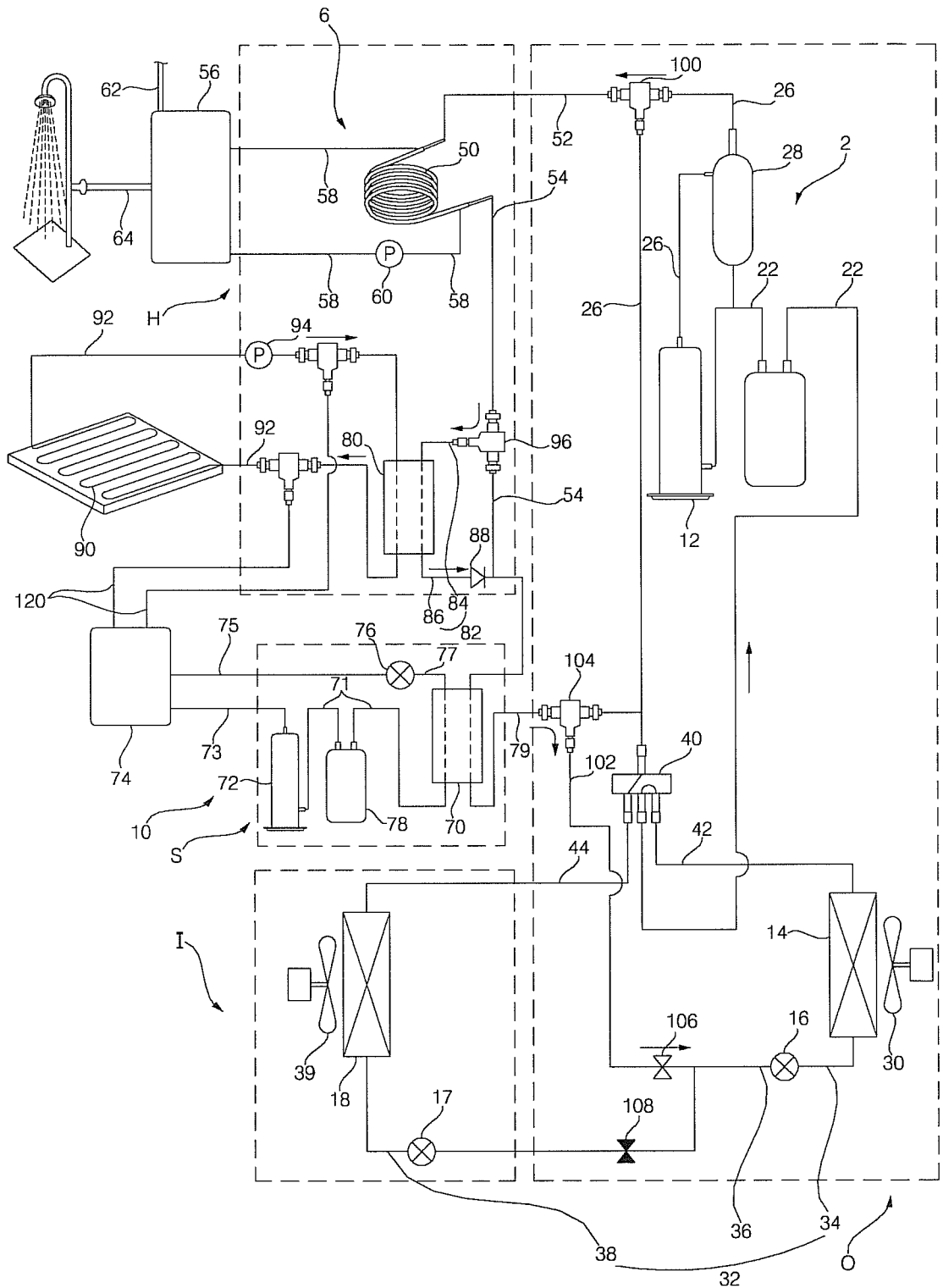
FIG. 4 is a diagram illustrating a flow of the refrigerant when the heat pump-type hot water supply apparatus (FIG. 2) is in a floor heating operation.

FIG. 4 is a diagram illustrating a flow of the refrigerant when the heat pump-type hot water supply apparatus (FIG. 2) is in the floor heating operation. Other embodiments and configurations may also be provided.

In the floor heating operation, the heat pump-type hot water supply apparatus may operate as follows.

The compressor 12 may be and the heat storage compressor 72 may be driven. The refrigerant controller 100 may control the first refrigerant to flow to the hot water supply heat exchanger 50. The water and refrigerant heat exchanger refrigerant controller 96 may control the first refrigerant of the hot water supply outflow path 54 to flow to the water and refrigerant heat exchanger 80. The auxiliary refrigerant controller 104 may control the first refrigerant of the cascade outflow path 79 to pass through the heat exchanger bypass path 102. The outdoor fan 30 may rotate, and the indoor fan 39 may not rotate. The cooling/heating switching valve 40 may be driven in the heating mode. The heat exchanger bypass valve 106 may be opened, and the liquid refrigerant valve 108 may be closed. The hot water supply pump 60 may not be driven, and the floor heating pump 94 may be driven.

When the floor heating pump 94 is driven, water of the floor heating pipe 90 may flow to the water and refrigerant heat exchanger 80 through the floor heating circulation path 92 to pass through the water and refrigerant heat exchanger 80, and thereafter may circulate to the floor heating pipe 90.

When the compressor 12 is driven, the first refrigerant compressed by the compressor 12 may pass through the refrigerant controller 100 and the hot water supply inflow path 52 and thereafter flows to the hot water supply heat exchanger 50, and the first refrigerant passes through the hot water supply heat exchanger 50 without heat exchanging. The first refrigerant passing through the hot water supply heat exchanger 50 flows into the water and refrigerant heat exchanger refrigerant controller 96 to flow into the water and refrigerant heat exchanger 80 and may be condensed while passing through the water and refrigerant heat exchanger 80.

The first refrigerant passing through the water and refrigerant heat exchanger 80 passes through the cascade heat exchanger 70 without heat exchanging and flows into the auxiliary refrigerant controller 104 and flows to the heat exchanger bypass path 102 and passes through the heat exchanger bypass valve 106, and thereafter expands by the outdoor expansion device 16. The first refrigerant expanded by the outdoor expansion device 16 exchanges heat with the outdoor air to be evaporated in the outdoor heat exchanger 14 and passes through the cooling/heating switching valve 40 to be recovered to the compressor 12.

The first refrigerant discharged from the compressor 12 passes in sequence through the hot water supply heat exchanger 50, the water and refrigerant heat exchanger 80, the cascade heat exchanger 70, the heat exchanger bypass path 102, the outdoor expansion device 16, the outdoor heat exchanger 14, and the cooling/heating switching valve 40, and thereafter is recovered to the compressor 12.

The water and refrigerant heat exchanger 80 may be heated while condensing the first refrigerant, and the floor heating pump 94 circulates the water of the floor heating pipe 90 to the water and refrigerant heat exchanger 80 and the floor heating pipe 90 to heat the water of the floor heating pipe 90.

During the floor heating operation, the water and refrigerant heat exchanger 80 condenses the first refrigerant, the outdoor heat exchanger 14 evaporates the first refrigerant, and the heat which the first refrigerant absorbs while being evaporated in the outdoor heat exchanger 14 is transferred to the floor heating pipe 90.

Figure 5:
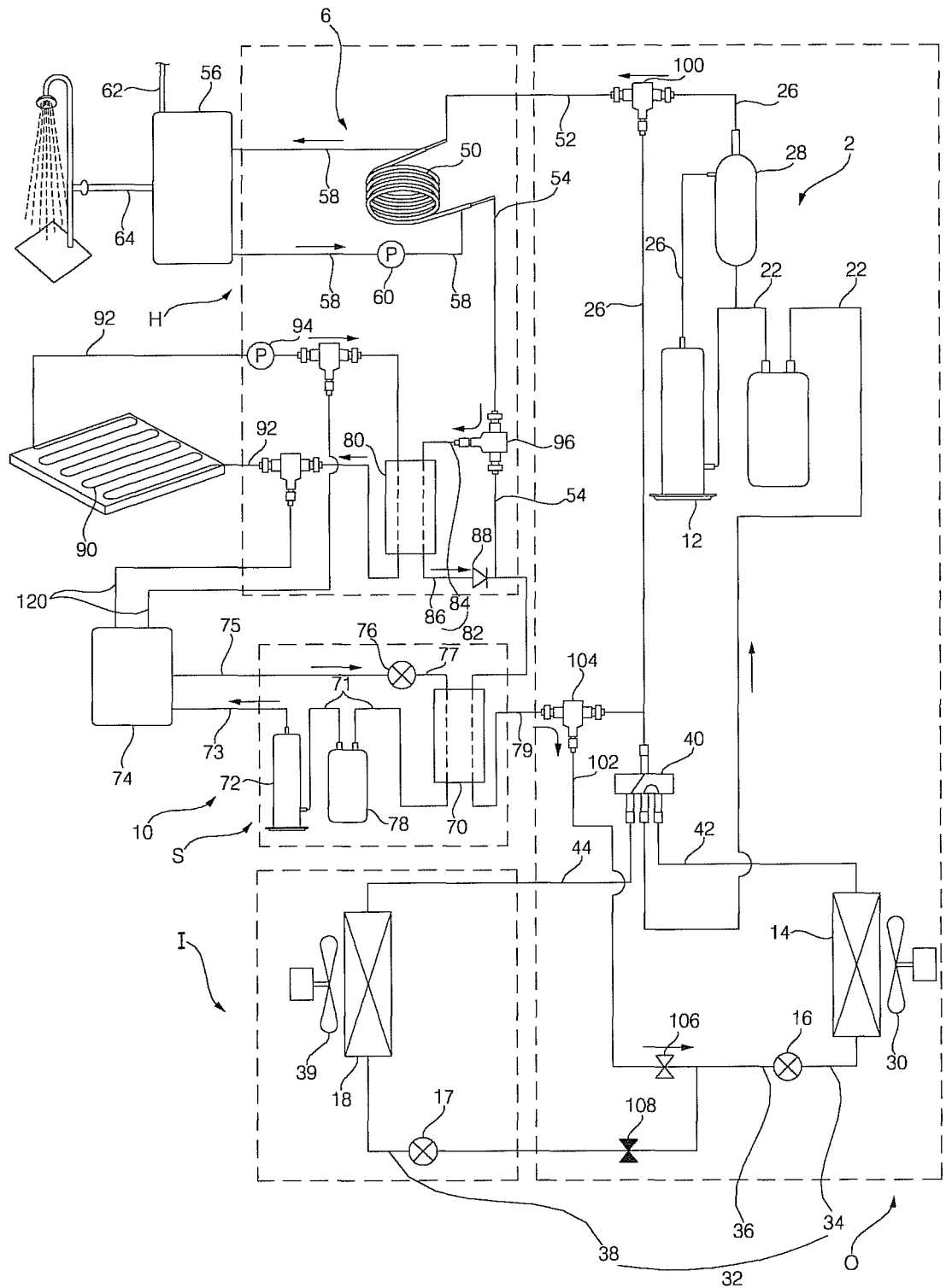
FIG. 5 is a diagram illustrating a flow of the refrigerant when the heat pump-type hot water supply apparatus (FIG. 2) is in a floor heating operation and a hot water supply/heat storage operation.

FIG. 5 is a diagram illustrating a flow of the refrigerant when the heat pump-type hot water supply apparatus (FIG. 2) is in the floor heating operation and the hot water supply/heat storage operation. Other embodiments and configurations may also be provided.

In a simultaneous operation of the floor heating operation and the hot water supply/heat storage operation, the heat pump-type hot water supply apparatus may operate as follows.

The compressor 12 and the heat storage compressor 72 may be driven. The refrigerant controller 100 may control the first refrigerant to flow to the hot water supply heat exchanger 50. The water and refrigerant heat exchanger refrigerant controller 96 may control the first refrigerant of the hot water supply outflow path 54 to flow to the water and refrigerant heat exchanger 80. The auxiliary refrigerant controller 104 may control the first refrigerant of the cascade outflow path 79 to pass through the heat exchanger bypass path 102. The outdoor fan 30 may rotate, and the indoor fan 39 may not rotate. The cooling/heating switching valve 40 may be driven in the heating mode. The heat exchanger bypass valve 106 may be opened, and the liquid refrigerant valve 108 may be closed. The hot water supply pump 60 and the floor heating pump 94 may be driven.

When the hot water supply pump 60 is driven, the water of the hot water supply tank 56 may flow to the hot water supply heat exchanger 50 through the hot water supply circulation path 58 and pass through the hot water supply heat exchanger 50, and thereafter may circulate to the hot water supply tank 56.

When the floor heating pump 94 is driven, the water of the floor heating pipe 90 flows to the water and refrigerant heat exchanger 80 through the floor heating circulation path 92 to pass through the water and refrigerant heat exchanger 80, and thereafter circulate to the floor heating pipe 90.

When the heat storage compressor 72 is driven, the second refrigerant compressed by the heat storage compressor 72 may be condensed in the heat storage tank 74 and thereafter may expand by the heat storage expansion device 76, evaporate while passing through the cascade heat exchanger 70, and recover to the heat storage compressor 72.

When the compressor 12 is driven, the first refrigerant compressed by the compressor 12 passes through the refrigerant controller 100 and the hot water supply inflow path and thereafter flows to the hot water supply heat exchanger 50, and the first refrigerant overheated in the compressor 12 exchanges heat with water to condense while passing through the hot water supply heat exchanger 50. The first refrigerant condensed in the hot water supply heat exchanger 50 flows into the water and refrigerant heat exchanger refrigerant controller 96, is recondensed while passing through the water and refrigerant heat exchanger 80, and is condensed while passing through the cascade heat exchanger 70.

The first refrigerant passing through the cascade heat exchanger 70 flows into the auxiliary refrigerant controller 104 and flows to the heat exchanger bypass path 102 and passes through the heat exchanger bypass valve 106, and thereafter expands by the outdoor expansion device 16. The refrigerant expanded by the outdoor expansion device 16 exchanges heat with the outdoor air to be evaporated in the outdoor heat exchanger 14 and passes through the cooling/heating switching valve 40 to be recovered to the compressor 12.

The first refrigerant discharged from the compressor 12 passes in sequence through the hot water supply heat exchanger 50, the water and refrigerant heat exchanger 80, the cascade heat exchanger 70, the heat exchanger bypass path 102, the outdoor expansion device 16, the outdoor heat exchanger 14, and the cooling/heating switching valve 40, and thereafter is recovered to the compressor 12.

The hot water supply heat exchanger 50 may condense and heat the first refrigerant and the hot water supply pump 60 may circulate the water of the hot water supply tank 56 to the hot water supply heat exchanger 50 and the hot water supply tank 56 to heat the water of the hot water supply tank 56.

The floor heating pump 94 may circulate the water of the floor heating pipe 90 to the water and refrigerant heat exchanger 80 and the floor heating pump 94 to heat the water of the floor heating pump 94.

The cascade heat exchanger 70 may be heated while recondensing the first refrigerant, and the second refrigerant circulates to the cascade heat exchanger 70 and the heat storage tank 74 by driving the hot water supply compressor 72 to heat the water of the heat storage tank 74.

During simultaneous operation of the floor heating operation and hot water supply/heat storage operation, the heat which the first refrigerant absorbs while being evaporated in the outdoor heat exchanger 14 may be transferred to the hot water supply tank 56, the floor heating pipe 90, and the heat storage tank 74.

The first refrigerant may be used to heat the water of the hot water supply tank 56, to heat the water of the floor heating pipe 90, and to heat the water of the heat storage tank 74. The second refrigerant may be used to heat the water of the heat storage tank 74 to thereby store heat in the heat storage tank 74 while increasing a temperature of the water of the hot water supply tank 56 and a temperature of the water of the floor heating pipe 90.

Figure 6:
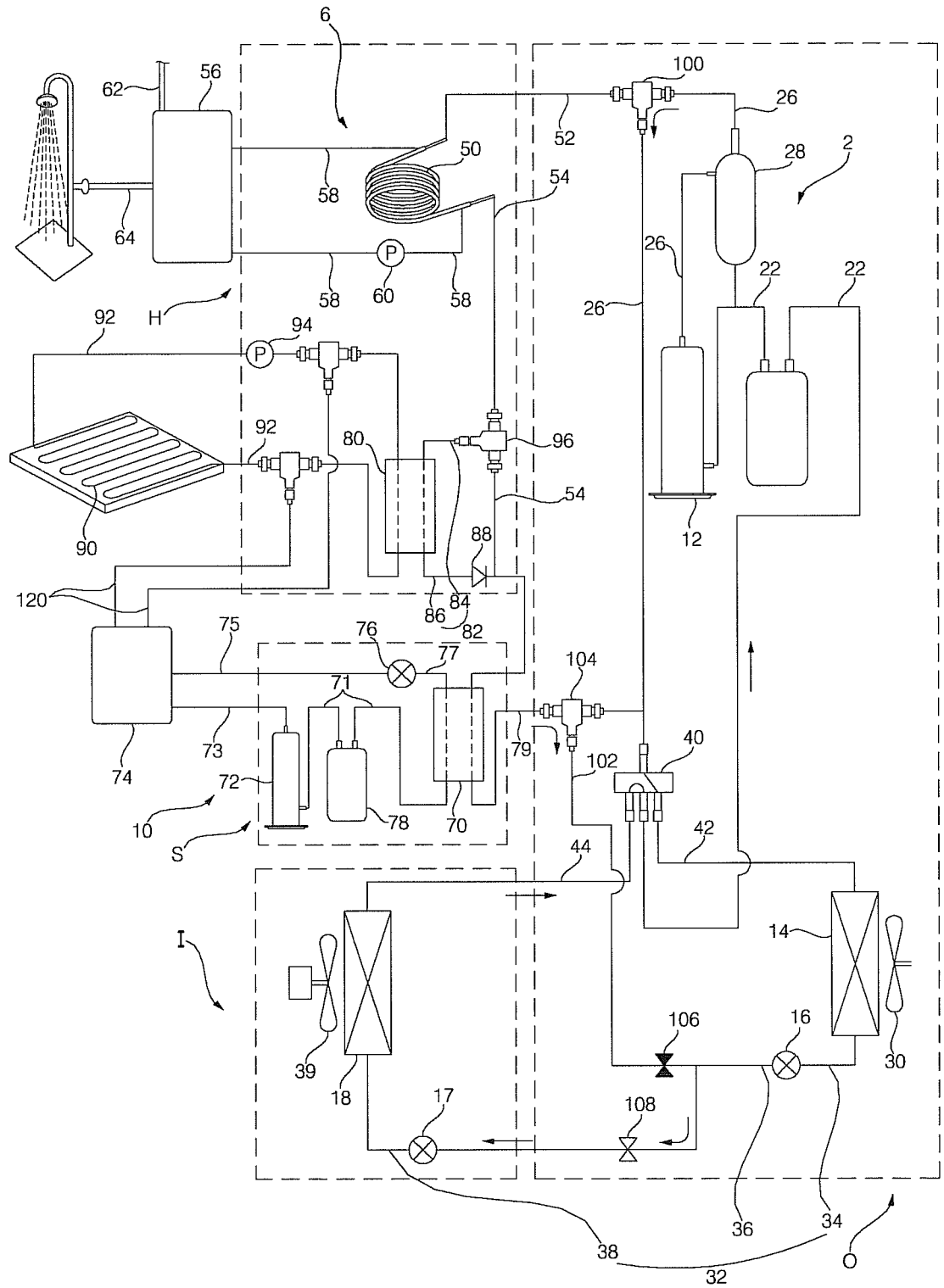
FIG. 6 is a diagram illustrating a flow of the refrigerant when the heat pump-type hot water supply apparatus (FIG. 2) is in a space cooling operation.

FIG. 6 is a diagram illustrating a flow of the refrigerant when the heat pump-type hot water supply apparatus (FIG. 2) is in the space cooling operation. Other embodiments and configurations may also be provided.

In the space cooling operation, the heat pump-type hot water supply apparatus may operate as follows.

The compressor 12 may be driven and the heat storage compressor 72 may not be driven. The refrigerant controller 100 may control the first refrigerant to bypass the hot water supply heat exchanger 50 and the cascade heat exchanger 70. Moreover the auxiliary refrigerant controller 104 may control the first refrigerant of the cascade outflow path 79 to pass through the heat exchanger bypass path 102. The outdoor fan 30 may rotate, and the indoor fan 39 may rotate. The cooling/heating switching valve 40 may be driven in the cooling mode. The heat exchanger bypass valve 106 may be closed, and the liquid refrigerant valve 108 may be opened. The hot water supply pump 60 and the floor heating pump 94 may not be driven.

When the compressor 12 is driven, the first refrigerant compressed by the compressor 12 passes through the refrigerant controller 100 and thereafter flows to the cooling/heating switching valve 40 and flows to the outdoor heat exchanger 14 to be condensed. The first refrigerant condensed in the outdoor heat exchanger 14 may expand while passing through at least one of the outdoor expansion device 16 and the indoor expansion device 17, flows to the indoor heat exchanger 18 to be evaporated in the indoor heat exchanger 18, and passes through the cooling/heating switching valve 40 to be recovered to the compressor 12.

The first refrigerant discharged from the compressor 12 passes in sequence through the cooling/heating switching valve 40, the outdoor heat exchanger 14, the outdoor expansion device 16, the indoor expansion device 17, the indoor heat exchanger 18, and the cooling/heating switching valve 40, and thereafter is recovered to the compressor 12.

The outdoor heat exchanger 14 condenses the first refrigerant, the indoor heat exchanger 18 evaporates the first refrigerant, and the indoor heat exchanger 18 cools the indoor air.

Figure 7:
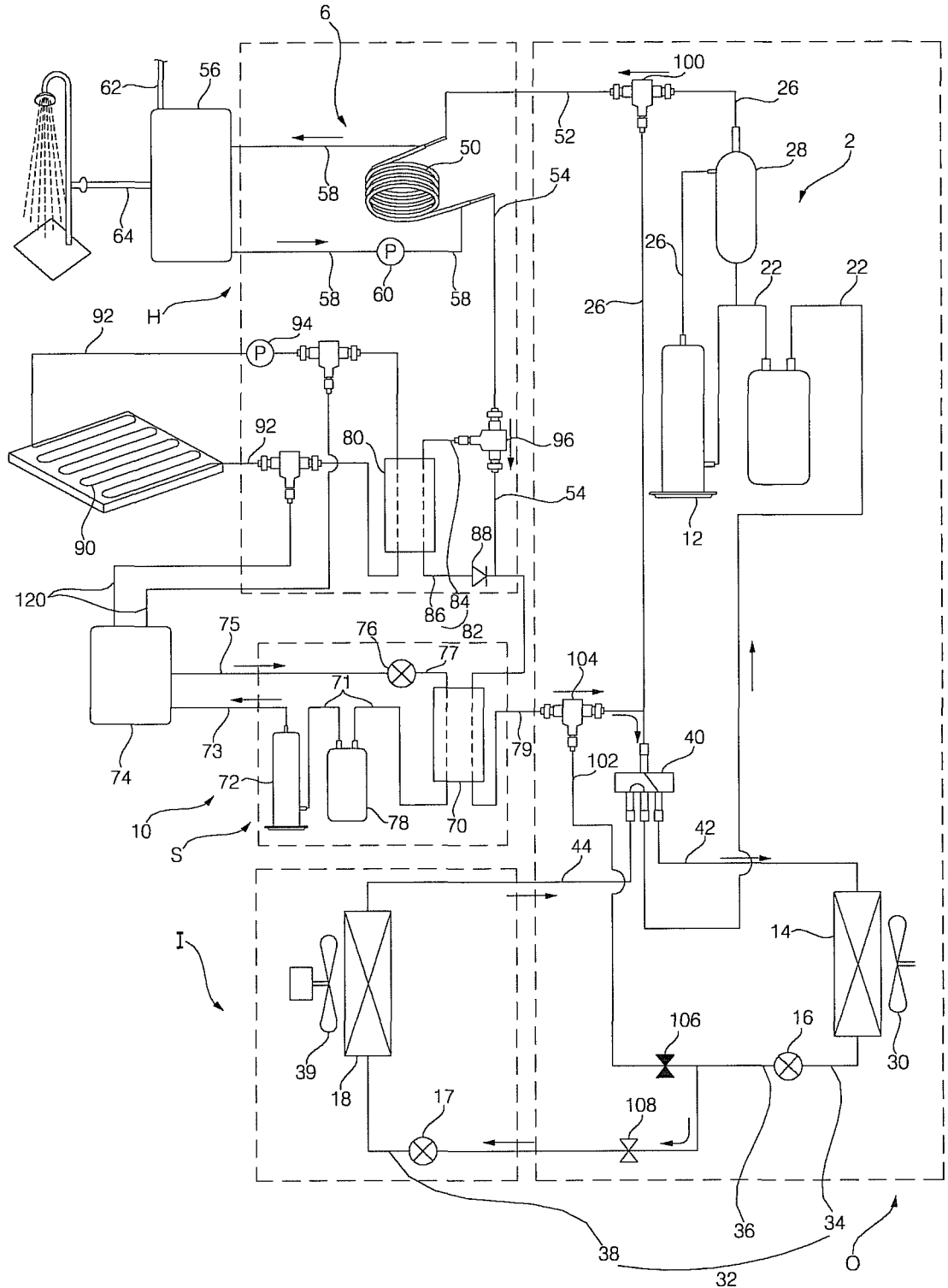
FIG. 7 is a diagram illustrating a flow of the refrigerant when the heat pump-type hot water supply apparatus (FIG. 2) is in a space cooling operation and a hot water supply/heat storage operation.

FIG. 7 is a diagram illustrating a flow of the refrigerant when the heat pump-type hot water supply apparatus (FIG. 2) is in the space cooling operation and the hot water supply/heat storage operation. Other embodiments and configurations may also be provided.

The heat pump-type hot water supply apparatus may operate as follows during simultaneous operation of the space cooling operation and the hot water supply/heat storage operation.

The compressor 12 and the heat storage compressor 72 may be driven. The refrigerant controller 100 may control the first refrigerant to flow to the hot water supply heat exchanger 50. The water and refrigerant heat exchanger refrigerant controller 96 may control the first refrigerant of the hot water supply outflow path 54 to bypass the water and refrigerant heat exchanger 80. The auxiliary refrigerant controller 104 may control the first refrigerant of the cascade outflow path 79 to bypass the heat exchanger bypass path 102 to flow to the cooling/heating switching valve 40. The outdoor fan 30 may rotate, and the indoor fan 39 may rotate. The cooling/heating switching valve 40 may be driven in the cooling mode. The heat exchanger bypass valve 106 may be closed, and the liquid refrigerant valve 108 may be opened. The hot water supply pump 60 may be driven, and the floor heating pump 94 may not be driven.

When the hot water supply pump 60 is driven, the water of the hot water supply tank 56 may flow to the hot water supply heat exchanger 50 through the hot water supply circulation path 58 and pass through the hot water supply heat exchanger 50, and thereafter circulate to the hot water supply tank 56.

When the heat storage compressor 72 is driven, the second refrigerant compressed by the heat storage compressor 72 may be condensed in the heat storage tank 74, and thereafter may be expanded by the heat storage expansion device 76, evaporated while passing through the cascade heat exchanger 70, and recovered to the heat storage compressor 72.

When the compressor 12 is driven, the first refrigerant compressed by the compressor 12 passes through the refrigerant controller 100 and the hot water supply inflow path 52 and thereafter flows to the hot water supply heat exchanger 50, and the first refrigerant overheated in the compressor 12 exchanges heat with water to be condensed while passing through the hot water supply heat exchanger 50. The first refrigerant condensed in the hot water supply heat exchanger 50 flows into the water and refrigerant heat exchanger refrigerant controller 96, bypasses the water and refrigerant heat exchanger 80, and flows into the cascade heat exchanger 70. The first refrigerant exchanges heat with the second refrigerant to be recondensed while passing through the cascade heat exchanger 70.

The first refrigerant passing through the cascade heat exchanger 70 flows into the auxiliary refrigerant controller 104 to flow to the cooling/heating switching valve 40 and flows to the outdoor heat exchanger 14 to be condensed. The first refrigerant condensed in the outdoor heat exchanger 14 is expanded while passing through at least one of the outdoor expansion device 16 and the indoor expansion device 17, flows to the indoor heat exchanger 18 to be evaporated in the indoor heat exchanger 18, and passes through the cooling/heating switching valve 40 to be recovered to the compressor 12.

The first refrigerant discharged from the compressor 12 passes in sequence through the hot water supply heat exchanger 50, the cascade heat exchanger 70, the cooling/heating switching valve 40, the outdoor heat exchanger 14, the outdoor expansion device 16, the indoor expansion device 17, the indoor heat exchanger 18, and the cooling/heating switching valve 40, and thereafter is recovered to the compressor 12.

The hot water supply heat exchanger 50 condenses and heats the first refrigerant, and the hot water supply pump 60 circulates the water of the hot water supply tank 56 to the hot water supply heat exchanger 50 and the hot water supply tank 56 to heat the water of the hot water supply tank 56.

The cascade heat exchanger 70 is heated while recondensing the first refrigerant, and the second refrigerant circulates to the cascade heat exchanger 70 and the heat storage tank 74 by driving the hot water supply compressor 72 to heat the water of the heat storage tank 74.

During the space cooling operation and the hot water supply/heat storage operation, the first refrigerant is condensed in each of the hot water supply heat exchanger 50 and the cascade heat exchanger 70 to heat the water of the hot water supply tank 56 and the water of the heat storage tank 74 in sequence, and thereafter is condensed in the outdoor heat exchanger 14 and evaporated in the indoor heat exchanger 18, and as a result the indoor heat exchanger 18 cools the indoor air.

Figure 8:
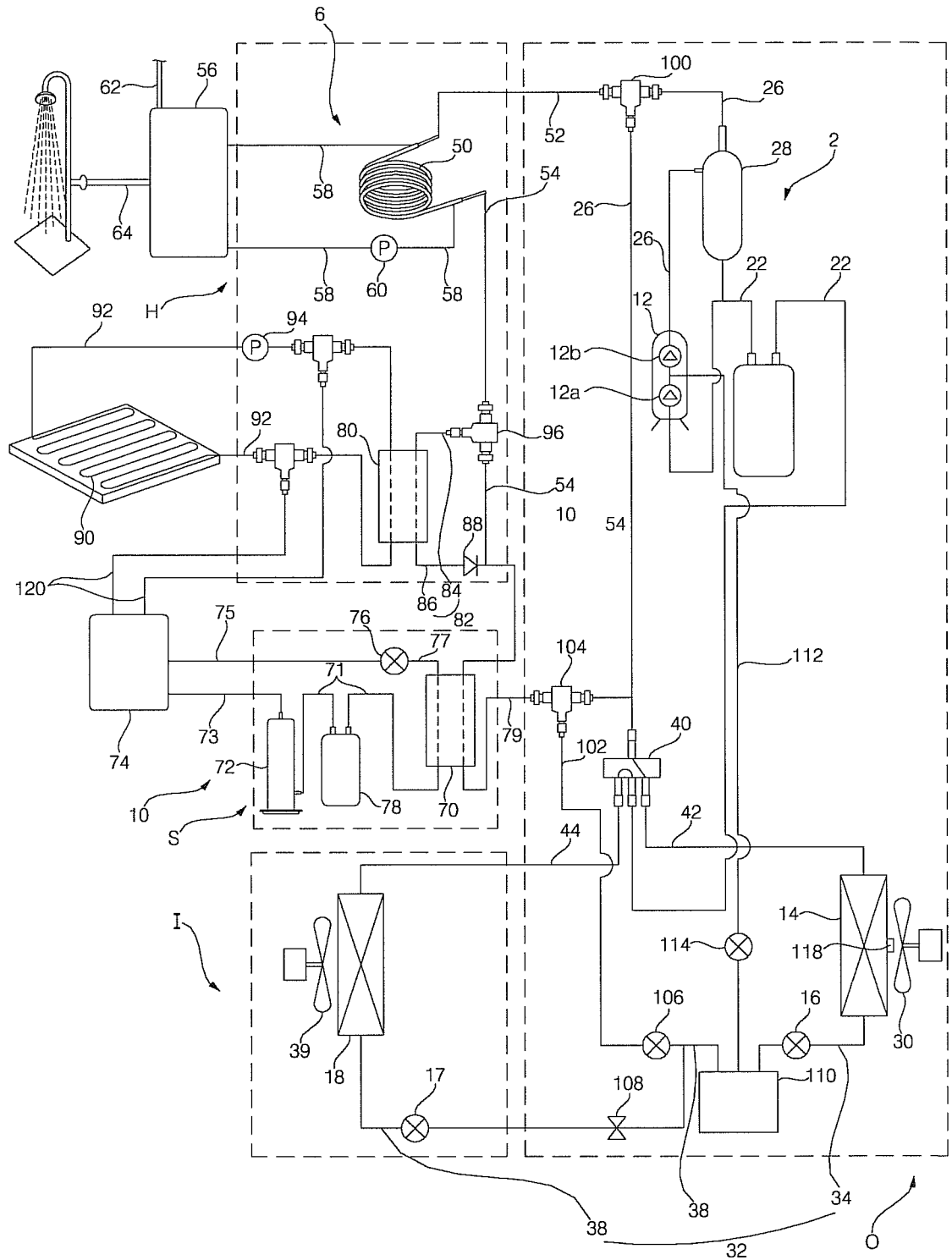
FIG. 8 is a diagram of a heat pump-type hot water supply apparatus according to an exemplary embodiment of the present invention.

FIG. 8 is a diagram of a heat pump-type hot water supply apparatus according to an exemplary embodiment of the present invention. Other embodiments and configurations may also be provided.

The heat pump-type hot water supply apparatus may be a multi-stage compressor in which the compressor 12 compresses a refrigerant by multi-stages, as shown in FIG. 8.

The compressor 12 may include a low-pressure compression unit 12a and a high-pressure compression unit 12b connected with the low-pressure compression unit 12a to compress a refrigerant compressed by the low-pressure compression unit 12a.

In the compressor 12, the low-pressure compression unit 12a and the high-pressure compression unit 12b may be connected to each other in series, a suction path 22 of the compressor may be connected to the low-pressure compression unit 12a, and a discharge path 26 of the compressor may be connected to the high-pressure compression unit 12b.

A gas-liquid separator 110 may be provided between the outdoor expansion device 16 and the indoor expansion device 17, and an injection line 112 for injecting a vapor refrigerant to the compressor 12 may be connected to the gas-liquid separator 110.

The gas-liquid separator 110 may be provided between the compressor heat exchanger bypass path 102 and the outdoor expansion device 16 to inject the vapor refrigerant to the compressor 12 during simultaneous operation of the hot water supply operation and the heating operation or the hot water supply operation, or the heating operation.

An injection refrigerant controller 114 may be provided in the injection line 112 to control the refrigerant injected into the compressor 12.

The injection refrigerant controller 114, which controls the vapor refrigerant that flows out from the gas-liquid separator 110, may include an open/close valve that is opened/closed through on/off control and an electronic expansion valve of which an opening degree is controlled through control of the opening control.

The injection refrigerant controller 114 may be closed when the heat pump-type hot water supply apparatus starts and may be opened depending on a temperature of the outdoor heat exchanger 14 after the heat pump-type hot water supply apparatus is stabilized.

A temperature sensor 118 that senses temperature may be provided in the outdoor heat exchanger 14, and the injection refrigerant controller 114 may be opened when the temperature sensed by the temperature sensor 118 is equal to or lower than a set temperature after the heat pump-type hot water supply is stabilized.

The heat pump-type hot water supply apparatus may include the electronic expansion valve that lowers a pressure of the refrigerant injected into the injection line 112 to a middle pressure between a condensation pressure and an evaporation pressure while preventing the liquid refrigerant in the gas-liquid separator 110 from flowing to the injection line 112 during simultaneous operation of the hot water supply operation and the heating operation or the hot water supply operation, or the heating operation.

The electronic expansion valve may be provided between the auxiliary refrigerant controller 104 and the gas-liquid separator 110. The electronic expansion valve may be provided between the heat exchanger bypass valve 106 and the gas-liquid separator 110, and may also be provided between the auxiliary refrigerant controller 104 and the heat exchanger bypass valve 106.

The heat exchanger bypass valve 106 may include the electronic expansion valve to lower the pressure of the refrigerant passing through the heat exchanger bypass path 102 to the middle pressure between the condensation pressure and the evaporation pressure during simultaneous operation of the hot water supply/heat storage operation and the floor heating operation or the hot water supply/heat storage operation or the floor heating operation, and to be closed during simultaneous operation of the air-conditioning operation and the hot water supply operation or simultaneous operation of the air-conditioning operation, the hot water supply operation, and the floor heating operation, or the air-conditioning operation.

Since remaining components and operations other than the compressor 12, heat exchanger bypass valve 106, the gas-liquid separator 110, the injection line 112, and the injection refrigerant controller 114 are the same or similar as those of the exemplary embodiment of the present invention, they may be represented by same reference numerals and a detailed description thereof may be omitted.

The hot water supply/heat storage operation may be described as an example.

The heat pump-type hot water supply apparatus may operate during the hot water supply/heat storage operation. While the heat pump-type hot water supply apparatus is stabilized after the heat pump-type hot water supply apparatus starts, if the temperature of the outdoor heat exchanger 14 is equal to or lower than a set temperature, the heat exchanger bypass valve 106 expands the refrigerant to a pressure between the condensation pressure of the hot water supply heat exchanger 50 and an evaporation pressure of the outdoor heat exchanger 14, and the injection refrigerant controller 114 may be opened.

When the heat exchanger bypass valve 106 expands the refrigerant and the refrigerant controller 114 is opened, a refrigerant having the middle pressure injected through the injection line 112 flows between the low-pressure compression unit 12a and the high-pressure compression unit 12b of the compressor 12 to cause a reduction of a compression work of the compressor 12 depending on the inflow of the refrigerant having the middle pressure, and the increase of a condensation capacity of the hot water supply heat exchanger 50 and the increase of a condensation capacity of the cascade heat exchanger 70. Therefore, efficient hot water supply/heat storage may be possible in a cold area or when outdoor temperature is low, and the maximum management temperature of the compressor 12 may be low.

In the heat pump-type hot water supply apparatus, even during simultaneous operation of the floor heating operation and the hot water supply/heat storage operation or the floor heating operation, the refrigerant having the middle pressure may be injected into the compressor 12 and an efficient operation may be possible.

Embodiments of the present invention are not limited to the above-described exemplary embodiment. The heat storage compressor 52 may include a multi-stage compressor. The electronic expansion valve and the gas-liquid separator 110 may be provided between the heat storage tank 74 and the heat storage expansion device 76 of the heat storage circuit 10. The injection line 112 for injecting the vapor refrigerant to the heat storage compressor 72 may be connected to the gas-liquid separator 110, and the injection refrigerant controller 114 may be provided on the injection line 112. Various exemplary embodiments may be made within the scope of embodiments of the present invention.

Since the heat pump-type hot water supply apparatus may increase the heat storage temperature and additionally use the refrigerant used for hot water supply and heat storage in space air-conditioning, it may be very efficient.

The heat pump-type hot water supply apparatus may perform all of hot water supply, floor heating, heat storage, and space air-conditioning at a same time.

The refrigerant having the middle pressure between the condensation pressure and the evaporation pressure may be injected into the compressor during the hot water supply operation to prevent hot water supply performance or heat storage performance from deteriorating under a low-temperature outdoor environment and the condensation performances of the hot water supply heat exchanger and the cascade heat exchanger may be improved to increase hot water supply efficiency and heat storage efficiency.

An exemplary embodiment may provide a heat pump type hot water supply apparatus that can store heat of a refrigerant used for water heating to improve efficiency and further increase heat storage temperature.

An exemplary embodiment may provide a heat pump-type hot water supply apparatus including: a refrigeration cycle circuit (including a compressor, an outdoor heat exchanger, expansion devices, and an indoor heat exchanger in which a first refrigerant is circulated) performing an air-conditioning operation; a hot water supply heat exchanger connected to the refrigeration cycle circuit to use the first refrigerant discharged from the compressor for hot water supply; a cascade heat exchanger connected to the refrigeration cycle circuit to allow the first refrigerant passing through the hot water supply heat exchanger to evaporate a second refrigerant and thereafter to be condensed, expanded, and evaporated in the refrigeration cycle circuit; a heat storage compressor compressing the second refrigerant evaporated in the cascade heat exchanger; a heat storage tank in which the second refrigerant compressed by the heat storage compressor heats water; and a heat storage expansion device expanding the second refrigerant condensed in the heat storage tank.

The hot water supply heat exchanger may be connected to the refrigeration cycle circuit and a hot water supply inflow path. The cascade heat exchanger may be connected to the refrigeration cycle circuit and a cascade outflow path. The hot water supply heat exchanger and the cascade heat exchanger may be connected to a hot water supply outflow path.

The refrigeration cycle circuit may further include a cooling/heating switching valve for switching a cooling operation and a heating operation. The hot water supply inflow path may be connected between the compressor and the cooling/heating switching valve. The cascade outflow path may connect the cascade heat exchanger and the cooling/heating switching valve to each other.

The apparatus may further include a water and refrigerant heat exchanger connected to a water and refrigerant heat exchanger connection path between the hot water supply heat exchanger and the cascade heat exchanger.

The apparatus may further include a water and refrigerant heat exchanger refrigerant controller controlling a flow of the first refrigerant to allow the first refrigerant passing through the hot water supply heat exchanger to pass through or bypass the water and refrigerant heat exchanger.

The apparatus may further include: a floor heating pipe connected to the water and refrigerant heat exchanger through a heating circulation path; and a floor heating pump installed on the heating circulation path.

The heat storage tank may be connected to the heating circulation path and a heat storage pipe.

The hot water supply heat exchanger may be connected to a hot water supply tank and a hot water supply circulation path. A hot water supply pump may be provided on the hot water supply circulation path. The heat storage tank may be connected to the hot water supply circulation path and the heat storage pipe.

The apparatus may further include a refrigerant controller for controlling a flowing direction of the first refrigerant discharged from the compressor to allow the first refrigerant discharged from the compressor to pass through or bypass the hot water supply heat exchanger and the cascade heat exchanger.

The apparatus may further include a heat exchanger bypass path connected to guide the first refrigerant passing through the cascade heat exchanger between the outdoor heat exchanger and the indoor heat exchanger to allow the first refrigerant passing through the cascade heat exchanger to bypass any one of the outdoor heat exchanger and the indoor heat exchanger.

The expansion devices may include an indoor expansion device and an outdoor expansion device. The heat exchanger bypass path may be connected between the indoor expansion device and the outdoor expansion device.

The apparatus may further include an auxiliary refrigerant controller controlling the flowing direction of the first refrigerant passing through the cascade heat exchanger to allow the first refrigerant passing through the cascade heat exchanger to pass through or bypass the heat exchanger bypass path.

The auxiliary refrigerant controller may control the first refrigerant to flow to the heat exchanger bypass path during a hot water supply operation.

The auxiliary refrigerant controller may control the refrigerant passing through the cascade heat exchanger to bypass the heat exchanger bypass path during simultaneous operation of the hot water supply operation and the air-conditioning operation.

The apparatus may further include a heat exchanger bypass valve provided on the heat exchanger bypass path for controlling the flow of the first refrigerant.

The apparatus may further include a liquid refrigerant valve provided between the heat exchanger bypass path and the indoor expansion device for controlling the flow of the first refrigerant.

The heat exchanger bypass valve may be opened during the hot water supply operation, and the liquid refrigerant valve may be closed during the hot water supply operation.

The expansion devices may include the indoor expansion device and the outdoor expansion device. The heat pump-type hot water supply apparatus may further include a gas-liquid separator provided between the indoor expansion device and the outdoor expansion device, and an injection line for injecting a vapor refrigerant of the gas-liquid separator into the compressor.

The apparatus may further include an injection refrigerant controller installed on the injection line to control the vapor refrigerant injected into the compressor.

The injection refrigerant controller may be closed when the apparatus starts and is opened after the apparatus is stabilized.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump-type hot water supply apparatus, comprising:
 a refrigeration cycle circuit that circulates a first refrigerant and performs an air-condition operation, the refrigeration cycle circuit including a compressor, an outdoor heat exchanger, expansion devices, and an indoor heat exchanger;

a hot water supply heat exchanger to use the first refrigerant from the compressor for a hot water supply;

a cascade heat exchanger to receive the first refrigerant that passes through the hot water supply heat exchanger and to evaporate a second refrigerant based on the first refrigerant;

a heat storage compressor to compress the second refrigerant evaporated in the cascade heat exchanger;

a heat storage tank to receive the compressed second refrigerant and to heat water based on the received second refrigerant; and a heat storage expansion device to expand the second refrigerant from the heat storage tank, wherein the hot water supply heat exchanger is connected to a hot water supply inflow path, the cascade heat exchanger is connected to a cascade outflow path, and the hot water supply heat exchanger and the cascade heat exchanger are each connected to a hot water supply outflow path, wherein the refrigeration cycle circuit further includes a cooling/heating switching valve to switch between a cooling operation and a heating operation, wherein the cooling/heating switching valve is connected to a compressor suction path and a compressor discharge path, the hot water supply inflow path is connected between the compressor and the cooling/heating switching valve, and the cascade outflow path connects the cascade heat exchanger and the compressor discharge path to each other, wherein the apparatus further comprises a heat exchanger bypass path to guide the first refrigerant that passes through the cascade heat exchanger to bypass any one of the outdoor heat exchanger or the indoor heat exchanger, and an auxiliary refrigerant controller provided between the cascade heat exchanger and the cooling/heating switching valve to selectively control the flow of the first refrigerant that passes through the cascade heat exchanger such that the first refrigerant passes through the heat exchanger bypass path or bypasses the heat exchanger bypass path.

2. The apparatus of claim 1, further comprising:

a water and refrigerant heat exchanger connected between the hot water supply heat exchanger and the cascade heat exchanger by a water and refrigerant heat exchanger connection path;

a water and refrigerant heat exchanger refrigerant controller to selectively control flow of the first refrigerant such that the first refrigerant passes through the water and refrigerant heat exchanger or bypasses the water and refrigerant heat exchanger.

3. The apparatus of claim 2, further comprising:

a floor heating pipe connected to the water and refrigerant heat exchanger by a heating circulation path; and a floor heating pump provided at the heating circulation path.

4. The apparatus of claim 1, further comprising:

a hot water supply tank connected to the hot water supply heat exchanger; and a hot water supply pump provided at a hot water supply circulation path.

5. The apparatus of claim 1, further comprising a refrigerant controller to selectively control the flow of the first refrigerant from the compressor such that the first refrigerant passes through the hot water supply heat exchanger and the cascade heat exchanger or bypasses the hot water supply heat exchanger and the cascade heat exchanger.

6. The apparatus of claim 1, wherein the expansion devices include an indoor expansion device and an outdoor expansion device, and the heat exchanger bypass path is between the indoor expansion device and the outdoor expansion device.

7. The apparatus of claim 1, further comprising a heat exchanger bypass valve provided on the heat exchanger bypass path to control the flow of the first refrigerant.

8. The apparatus of claim 7, further comprising a liquid refrigerant valve provided between the heat exchanger bypass path and the indoor expansion device to control the flow of the first refrigerant.

9. The apparatus of claim 1, wherein the expansion devices include the indoor expansion device and the outdoor expansion device, and the heat pump-type hot water supply apparatus further comprises:

a gas-liquid separator between the indoor expansion device and the outdoor expansion device, and an injection line for injecting a vapor refrigerant of the gas-liquid separator into the compressor.

10. The apparatus of claim 9, further comprising an injection refrigerant controller provided at the injection line to control the vapor refrigerant injected into the compressor.

* * * * *